US012645816B2

(12) United States Patent　　　　(10) Patent No.: US 12,645,816 B2
Ueki et al.　　　　　　　　　　　　　　(45) Date of Patent: Jun. 2, 2026

(54) UNAUTHORIZED ACCESS DETECTION DEVICE AND UNAUTHORIZED ACCESS DETECTION METHOD

(71) Applicant: Hitachi Solutions, Ltd., Tokyo (JP)

(72) Inventors: Yuki Ueki, Tokyo (JP); Tateki Harada, Tokyo (JP); Tomohiro Shigemoto, Tokyo (JP); Katsuya Nishijima, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 114 days.

(21) Appl. No.: 18/464,515

(22) Filed: Sep. 11, 2023

(65) Prior Publication Data

US 2024/0289476 A1　　Aug. 29, 2024

(30) Foreign Application Priority Data

Feb. 28, 2023　(JP) ................................. 2023-029568

(51) Int. Cl.
*G06F 21/62*　　　(2013.01)
*G06F 21/55*　　　(2013.01)
(52) U.S. Cl.
CPC ........ G06F 21/6209 (2013.01); G06F 21/552 (2013.01); *G06F 2221/034* (2013.01)
(58) Field of Classification Search
None
See application file for complete search history.

(56) References Cited

U.S. PATENT DOCUMENTS

| 8,925,074 | B1 * | 12/2014 | Ho | G06F 21/56 711/201 |
|---|---|---|---|---|
| 10,355,866 | B2 * | 7/2019 | Liu | H04L 63/0853 |
| 10,586,052 | B1 * | 3/2020 | Marelas | G06F 3/0656 |
| 11,120,131 | B2 | 9/2021 | Chen et al. | |
| 2019/0042781 | A1 | 2/2019 | Lukacs et al. | |
| 2019/0108340 | A1 * | 4/2019 | Bedhapudi | G06F 21/554 |

(Continued)

FOREIGN PATENT DOCUMENTS

| JP | 2020-529681 A | 10/2020 |
|---|---|---|

OTHER PUBLICATIONS

Notice of Reasons for Refusal, mailed Mar. 3, 2026, for Japanese Application No. 2023-029568 (with English translation).

*Primary Examiner* — Kaveh Abrishamkar
(74) *Attorney, Agent, or Firm* — Baker Botts L.L.P.

(57)　　　　ABSTRACT

An information processing device, comprising: a processor; and a memory storing a program causing the processor to: (A) acquire first input/output request data for accessing a write destination file; (B) specify data to be written into the write destination file on a basis of the first acquired input/output request data; (C) determine that the specified data is abnormal data, if all of conditions about the specified data are satisfied, wherein the conditions about the specified data are conditions for determining abnormal data; and (D) execute predetermined processing related to access to the write destination file, if it is determined that the specified data is abnormal data, wherein (C) further includes: calculating a first degree of randomness of the specified data; determining that a first condition of the conditions about the specified data is satisfied; and determining that a second condition of the conditions about the specified data is satisfied.

26 Claims, 7 Drawing Sheets

(56) References Cited

U.S. PATENT DOCUMENTS

| 2019/0108341 A1* | 4/2019 | Bedhapudi | G06F 16/1734 |
| 2019/0130097 A1 | 5/2019 | Berler et al. | |
| 2020/0250522 A1* | 8/2020 | Meiri | G06N 3/08 |

* cited by examiner

UNAUTHORIZED ACCESS DETECTION SYSTEM 1

FIG. 3

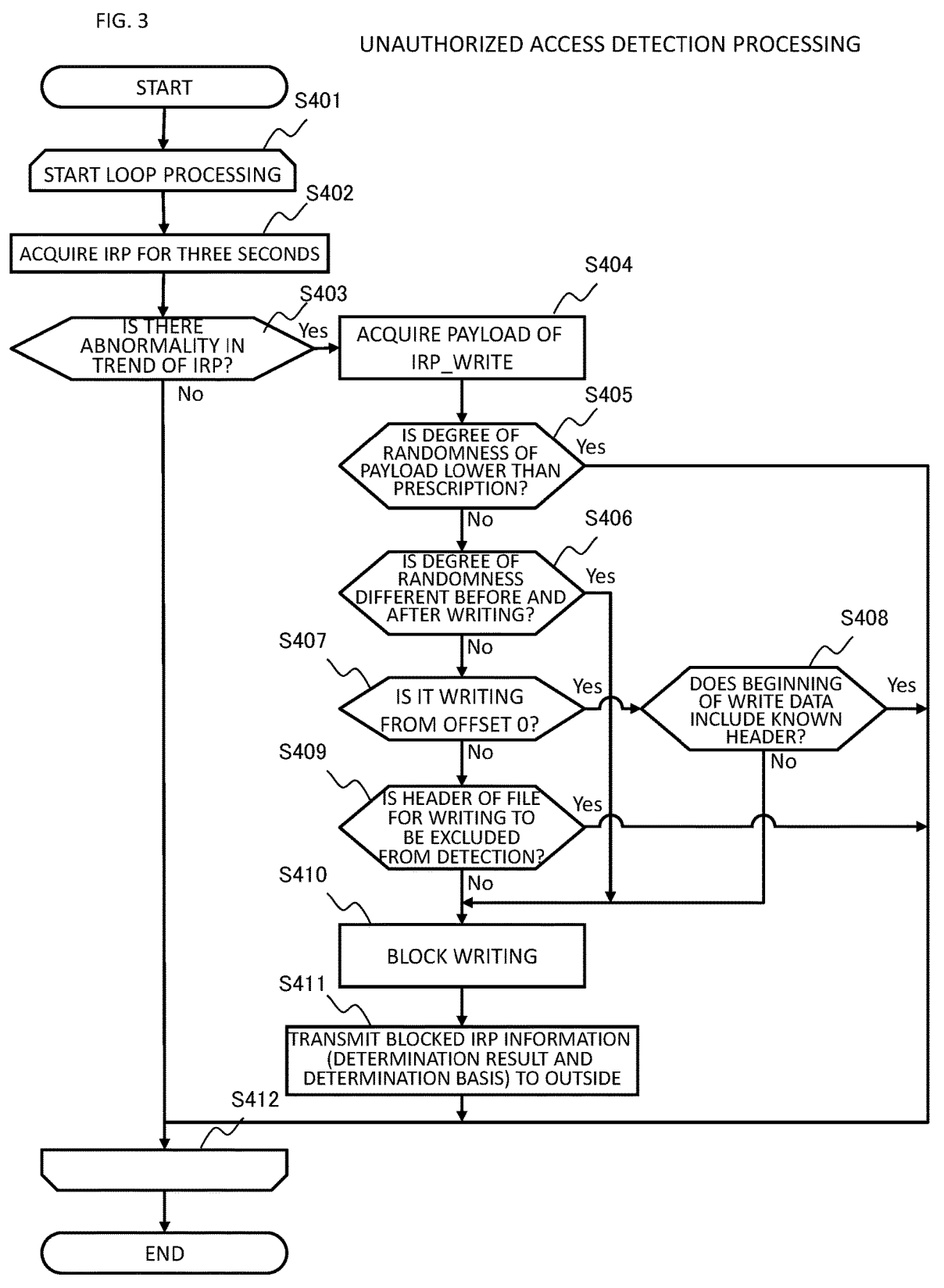

UNAUTHORIZED ACCESS DETECTION PROCESSING

START
S401

START LOOP PROCESSING
S402

ACQUIRE IRP FOR THREE SECONDS
S403

IS THERE ABNORMALITY IN TREND OF IRP? — Yes

No

S404
ACQUIRE PAYLOAD OF IRP_WRITE

S405
IS DEGREE OF RANDOMNESS OF PAYLOAD LOWER THAN PRESCRIPTION? — Yes

No

S406
IS DEGREE OF RANDOMNESS DIFFERENT BEFORE AND AFTER WRITING? — Yes

No

S407
IS IT WRITING FROM OFFSET 0? — Yes

No

S408
DOES BEGINNING OF WRITE DATA INCLUDE KNOWN HEADER? — Yes

No

S409
IS HEADER OF FILE FOR WRITING TO BE EXCLUDED FROM DETECTION? — Yes

No

S410
BLOCK WRITING

S411
TRANSMIT BLOCKED IRP INFORMATION (DETERMINATION RESULT AND DETERMINATION BASIS) TO OUTSIDE

S412

END

FIG. 4

IRP TO BE ANALYZED

| # | IRP NAME |
|---|----------|
| 1 | IRP_SET_INFORMATION |
| 2 | IRP_OPEN |
| 3 | IRP_CREATE |
| 4 | IRP_CLOSE |
| 5 | IRP_READ |
| 6 | IRP_WRITE |
| 7 | IRP_CLEANUP |
| 8 | IRP_DIRECTORY_CONTROL |
| 9 | IRP_FLUSH_BUFFERS |
| 10 | IRP_QUERY_SECURITY |

DIFFERENCE IN NUMBER OF IRPS BETWEEN NORMAL
CONDITIONS AND ABNORMAL CONDITIONS

FIG. 6

FILE HEADER TABLE <u>125</u>

| 201 | 202 | 203 | 204 |
|-----|-----|-----|-----|
| ID | FILE TYPE | HEADER VALUE | HEADER LENGTH |
| 1 | Jpg | \xFF\xD8\xFF | 3 |
| 2 | Pdf | \x25\x50\x44\x46\x20 | 5 |
| .. | .. | .. | .. |

FIG. 7

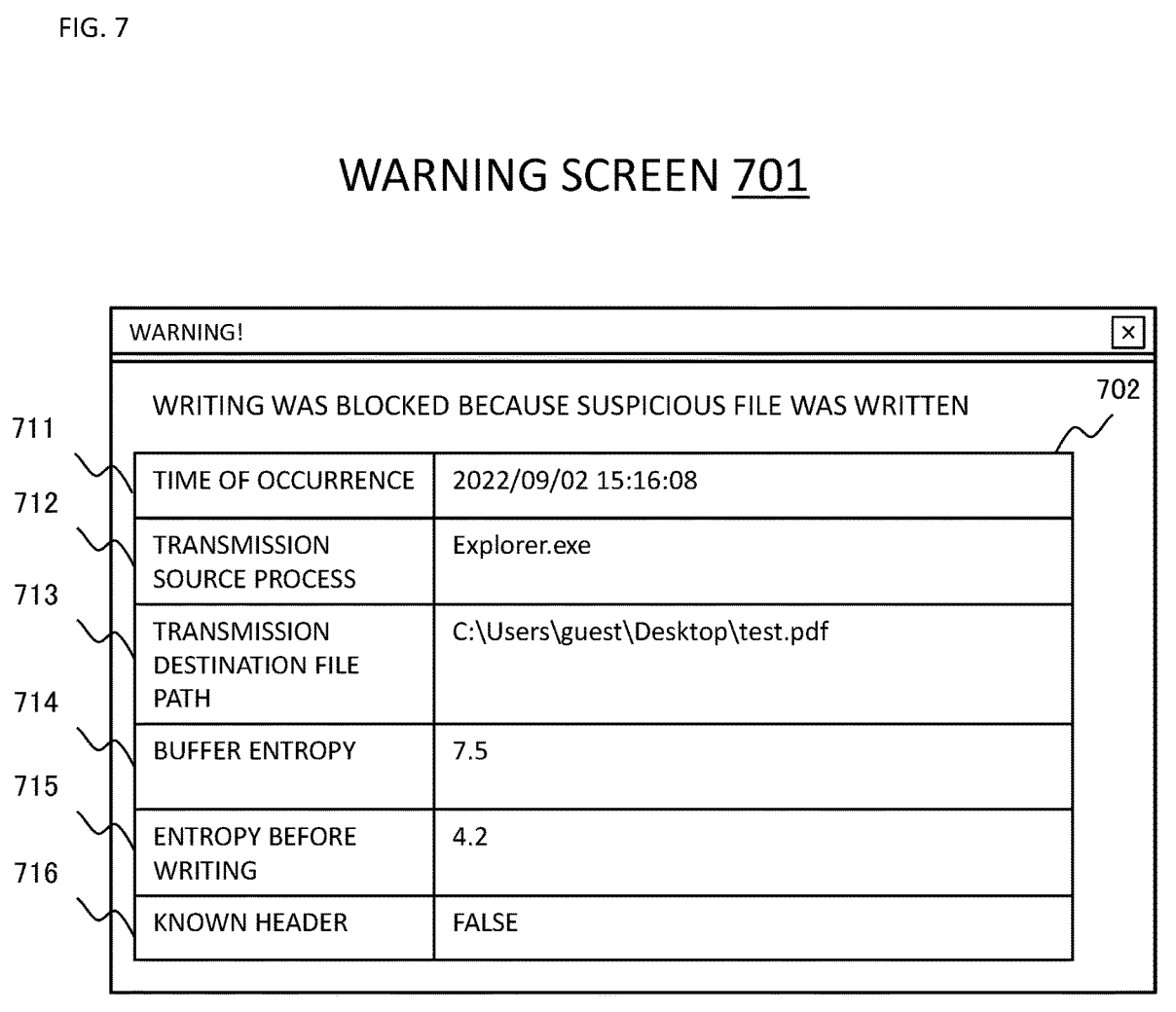

WARNING SCREEN 701

| WARNING! | | ☒ |
|---|---|---|
| WRITING WAS BLOCKED BECAUSE SUSPICIOUS FILE WAS WRITTEN | | 702 |
| TIME OF OCCURRENCE | 2022/09/02 15:16:08 | |
| TRANSMISSION SOURCE PROCESS | Explorer.exe | |
| TRANSMISSION DESTINATION FILE PATH | C:\Users\guest\Desktop\test.pdf | |
| BUFFER ENTROPY | 7.5 | |
| ENTROPY BEFORE WRITING | 4.2 | |
| KNOWN HEADER | FALSE | |

711
712
713
714
715
716

UNAUTHORIZED ACCESS DETECTION DEVICE AND UNAUTHORIZED ACCESS DETECTION METHOD

CROSS-REFERENCE TO RELATED APPLICATION

This application claims priority to Japanese patent application No. 2023-029568, filed on Feb. 28, 2023, the entire disclosure of which is incorporated herein by reference.

BACKGROUND OF THE INVENTION

1. Field of the Invention

The present invention relates to an unauthorized access detection device and an unauthorized access detection method.

2. Description of the Related Art

In recent years, social dependence on computers and the Internet has been further increasing. Accordingly, attacks on computer networks including malware are having a more serious impact on society. In addition, although such attacks on networks have been traditionally carried out in many cases for the purpose of showing the technical skill of the attacker or by a crime for pleasure, attacks for the purpose of practical benefits such as stealing money or personal information have been increasing in recent years.

Ransomware is one type of malware that mainly aims to collect money. The ransomware encrypts important files of the user to make them unusable and uses these files as ransom to demand transmission of money such as digital currency in exchange for restoring the files. The damage by ransomware has become noticeable since around 2005 and has recently become such a serious security problem that it has been named as a major security threat.

As a method of protecting a system from ransomware, there is protection at an endpoint using an antivirus product or the like. As the main method for malware detection that has been traditionally used in many cases, there is a method of detecting malware using a signature unique to the malware. However, this method can only detect malware which has been observed in the past and whose signature is known.

Thus, there is a technique to detect malware by detecting suspicious behavior of ransomware that is different from normal states. For example, U.S. Pat. No. 11,120,131 describes an attempt to detect an infection of ransomware in a file system in two stages by using backup data of a machine. In the first stage, the behavior of a file system obtained by loading backup data and creating file system metadata is analyzed. In the case where the behavior is determined to be abnormal in the first stage, the content of the file corresponding to the file operation is analyzed in the second stage. Here, for example, the entropy of the file is used as a characteristic. The system combines the analysis results in the first stage and the second stage to determine an infectious disease score that reflects the probability of a ransomware infection in the file system.

SUMMARY OF THE INVENTION

The technique described in U.S. Pat. No. 11,120,131 can detect unknown ransomware because it employs a detection method using suspicious behavior of ransomware, unlike a signature-based detection system. However, since ransomware is detected by using backup data, the detection is not in real time and files that ransomware attempts to encrypt cannot be protected before a certain number of files are encrypted.

The present invention has been made in view of such circumstances, and the object thereof is to provide an unauthorized access detection device and an unauthorized access detection method capable of quickly detecting an unauthorized file modification with less data.

One embodiment for solving the above problems is an unauthorized access detection device that includes a control device for executing: abnormal access request detection processing in which a plurality of pieces of input/output request data for accessing a file is acquired and it is determined whether or not an access mode to the file is abnormal on the basis of patterns of the acquired plurality of pieces of input/output request data; abnormal data detection processing in which, in a case where it is determined that the access mode to the file is abnormal, it is determined, by specifying data to be written into the file on the basis of the acquired input/output request data and specifying a trend of the specified data, whether or not the specified data is abnormal data; and suspicious process resolution processing in which, in a case where it is determined that the specified data is abnormal data, predetermined processing related to access to the file is executed.

According to the present invention, it is possible to quickly detect an unauthorized file modification with less data.

Configurations, effects, and the like other than those described above will be clarified by the following description of the embodiment.

BRIEF DESCRIPTION OF THE DRAWINGS

FIG. 3 is a flowchart explaining details of the unauthorized access detection processing;

FIG. 4 is a diagram illustrating an example of the types of IRPs to be analyzed for trends in the present embodiment;

FIG. 6 is a diagram illustrating an example of a file header table; and

FIG. 7 is a diagram illustrating an example of a warning screen.

DESCRIPTION OF THE PREFERRED EMBODIMENTS

Hereinafter, an embodiment of the present invention will be described in detail on the basis of the drawings. In the present embodiment, the same reference signs will be given to the same configurations in principle, and redundant explanation thereof will be omitted. It should be noted that the present embodiment is only an example for realizing the present invention and does not limit the technical scope of the present invention.

Figure 1:
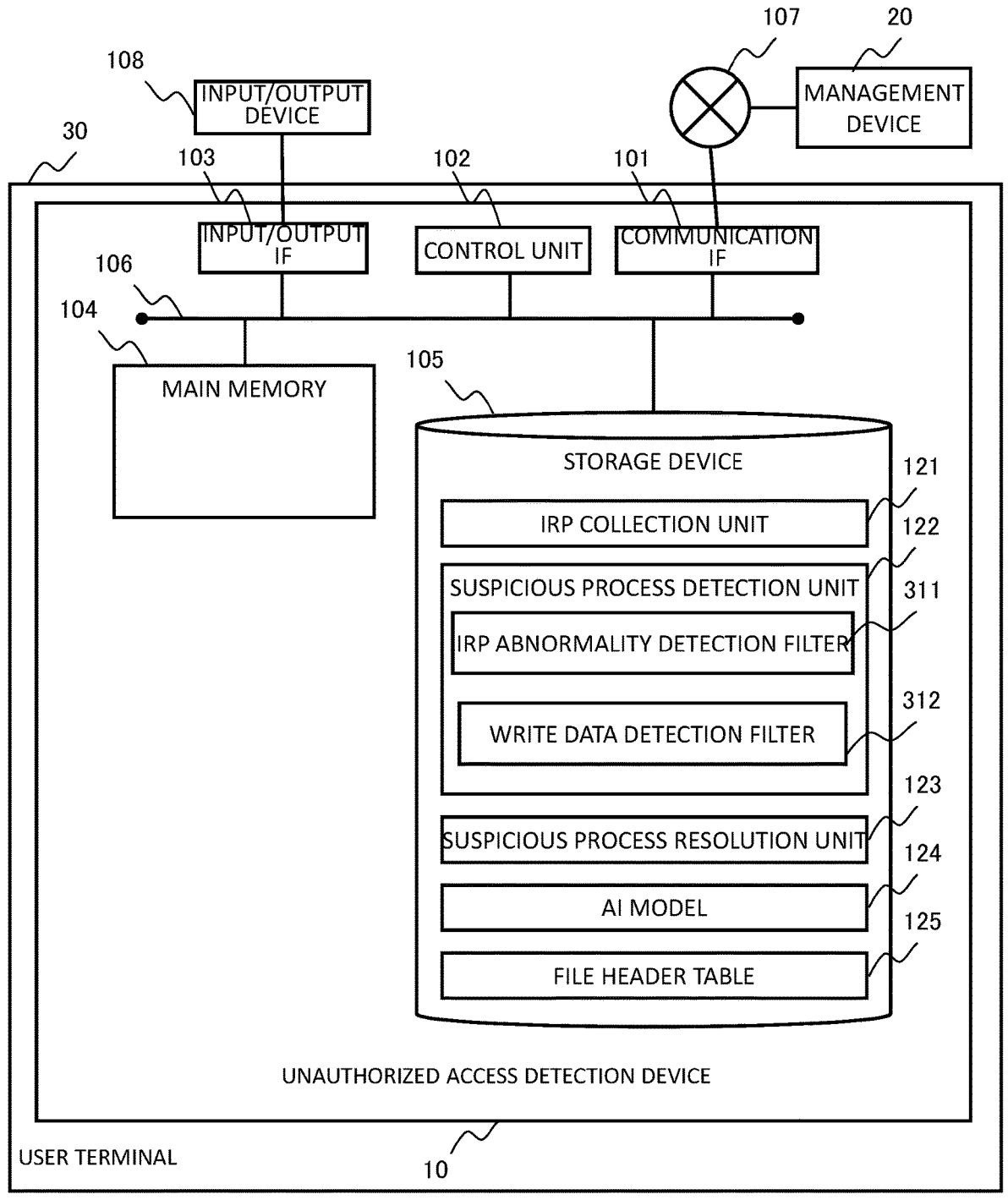
FIG. 1 is a diagram illustrating an example of a configuration of an unauthorized access detection system according to an embodiment of the present invention.

FIG. 1 is a diagram illustrating an example of a configuration of an unauthorized access detection system 1 according to the present embodiment. The unauthorized access detection system 1 includes an unauthorized access detection device 10, an input/output device 108 such as a keyboard, a mouse, a touch panel, or a display, and a management device 20. In the present embodiment, it is assumed that the unauthorized access detection device 10 is incorporated into a user terminal 30 (to be described next) used by a user, but may be configured separately from the user terminal.

The user terminal 30 is an information processing device used by a user in an organization and directs execution of an application described later.

The management device 20 is an information processing device used by an administrator who manages the unauthorized access detection device 10. The administrator may be the administrator of a security management department in the organization to which the user belongs or the administrator of an external security management organization such as a managed service.

The unauthorized access detection device 10 stores one or more applications executed by the operating system (OS) described later. The unauthorized access detection device 10 executes various applications on the basis of user instructions and the like or automatically. Each application accesses (reads and writes data to and from) various files stored in a storage device 105 described later.

In addition, the unauthorized access detection device 10 detects unauthorized encryption of data used by the application or the like in the unauthorized access detection device 10 and writing of the data into a file (hereinafter, referred to as encrypted write) by ransomware or the like. Specifically, as described later, the unauthorized access detection device 10 determines the presence or absence of an abnormality in an access mode by monitoring an I/O request packet (IRP) for accessing a file by an application, and in the case where it is determined that there is an abnormality, whether or not data to be written into the file is abnormal data (suspicious data) is determined by calculating the degree of randomness or the like of the data to be written. In the case where it is determined that the data to be written into the file is abnormal data, the unauthorized access detection device 10 blocks writing into the file and transmits information or the like related to the IRP to the management device 20.

The unauthorized access detection device 10 is an information processing device including a communication interface (communication IF) 101, a control unit 102, an input/output interface (input/output IF) 103, a main memory 104, a storage device 105, and a communication channel 106 such as a bus or a cable for connecting these units.

The control unit 102 is a central processing unit (CPU) or the like, and is a device that executes programs stored in the main memory 104 and controls each unit of the unauthorized access detection device 10.

The main memory 104 is a semiconductor storage device such as a random access memory (RAM) or a read only memory (ROM), and temporarily stores various programs and necessary work data.

The storage device 105 is, for example, a large-capacity magnetic storage device or a semiconductor storage device such as a hard disk drive (HDD) or a solidstate drive (SSD), and records various programs and necessary data.

The input/output IF 103 is connected to the input/output device 108 and mediates input/output of data.

The communication IF 101 consists of a network interface card (NIC), a wireless communication module, a universal serial interface (USB) module, a serial communication module, or the like, and is connected to the unauthorized access detection device 10 via a network 107. The network 107 is a wired or wireless communication network such as the Internet, a local area network (LAN), a wide area network (WAN), or a leased line.

The management device 20 also includes hardware similar to the above.

Next, the unauthorized access detection device 10 (storage device 105) stores each program of an IRP collection unit 121, a suspicious process detection unit 122, and a suspicious process resolution unit 123. In addition, the unauthorized access detection device 10 (storage device 105) stores an artificial intelligence (AI) model 124 and a file header table 125.

Here, the unauthorized access detection device 10 stores the operating system (OS) for executing each application. The OS includes an I/O manager. The I/O manager generates the input/output request packet (IRP), which is predetermined structure data, when an input/output (I/O) request related to file access occurs from a process generated and executed by an application.

The IRP collection unit 121 is a program that collects the input/output request packet (IRP) generated by the I/O manager. The collection of the IRP is performed under the kernel mode associated with the OS.

The suspicious process detection unit 122 is a program that evaluates whether or not a process that executes file access is a suspicious process by using the IRPs collected by the IRP collection unit 121.

Specifically, the suspicious process detection unit 122 includes an IRP abnormality detection filter 311 and a write data detection filter 312. The IRP abnormality detection filter 311 acquires a plurality of pieces of input/output request data (IRP) for accessing a file, and determines whether or not an access mode to the file is abnormal on the basis of the patterns of the acquired pieces of input/output request data.

Here, the IRP abnormality detection filter 311 determines whether or not the access mode to the file is abnormal by using the AI model 124. The AI model 124 is a pre-trained model that has learned the characteristics of the input/output request packets related to file access.

In the case where the write data detection filter 312 determines that the access mode to the file is abnormal, data to be written into the file is specified on the basis of the input/output request data acquired by the suspicious process detection unit 122 and the trend of the specified data (write data) is specified, so that it is determined whether or not the specified data is abnormal data.

Here, the write data detection filter 312 determines whether or not the specified data (write data) is abnormal data by using the file header table 125. The file header table 125 is a table in which a type of file for holding data with a high degree of randomness (referred to as entropy in the present embodiment) and the header of the file of the type are stored in association with each other.

Next, the suspicious process resolution unit 123 is a program that executes predetermined processing related to access to the file in the case where it is determined that the data (write data) specified by the write data detection filter 312 is abnormal data.

For example, in the case where it is determined that the data specified by the write data detection filter 312 is abnormal data, the suspicious process resolution unit 123 blocks access to the file into which the specified data is to be written. In addition, the suspicious process resolution unit 123 transmits IRP information related to the blocked access to the management device 20.

Each program of each information processing device in the unauthorized access detection system 1 described above is executed by the control unit 102 by reading it from the main memory 104 or the storage device 105. In addition, each program can be distributed by recording it in, for example, a portable or fixed recording medium. It should be noted that all or some of these programs may be implemented by using virtual information processing resources provided by using virtualization technology, process space separation technology, and the like, such as a virtual server provided by a cloud system. In addition, all or some of these programs may be implemented by services provided by, for example, a cloud system via an application programming interface (API) or the like. It should be noted that the program or data held by the unauthorized access detection system 1 can be held in a device different from the information processing device illustrated in FIG. 1. In addition, in the present embodiment, the functions thereof are implemented by the computer executing software as described above, but it may be implemented by hardware logic.

Next, the processing performed in the unauthorized access detection system 1 will be described.

<Overview of Unauthorized Access Detection Processing>

Figure 2:
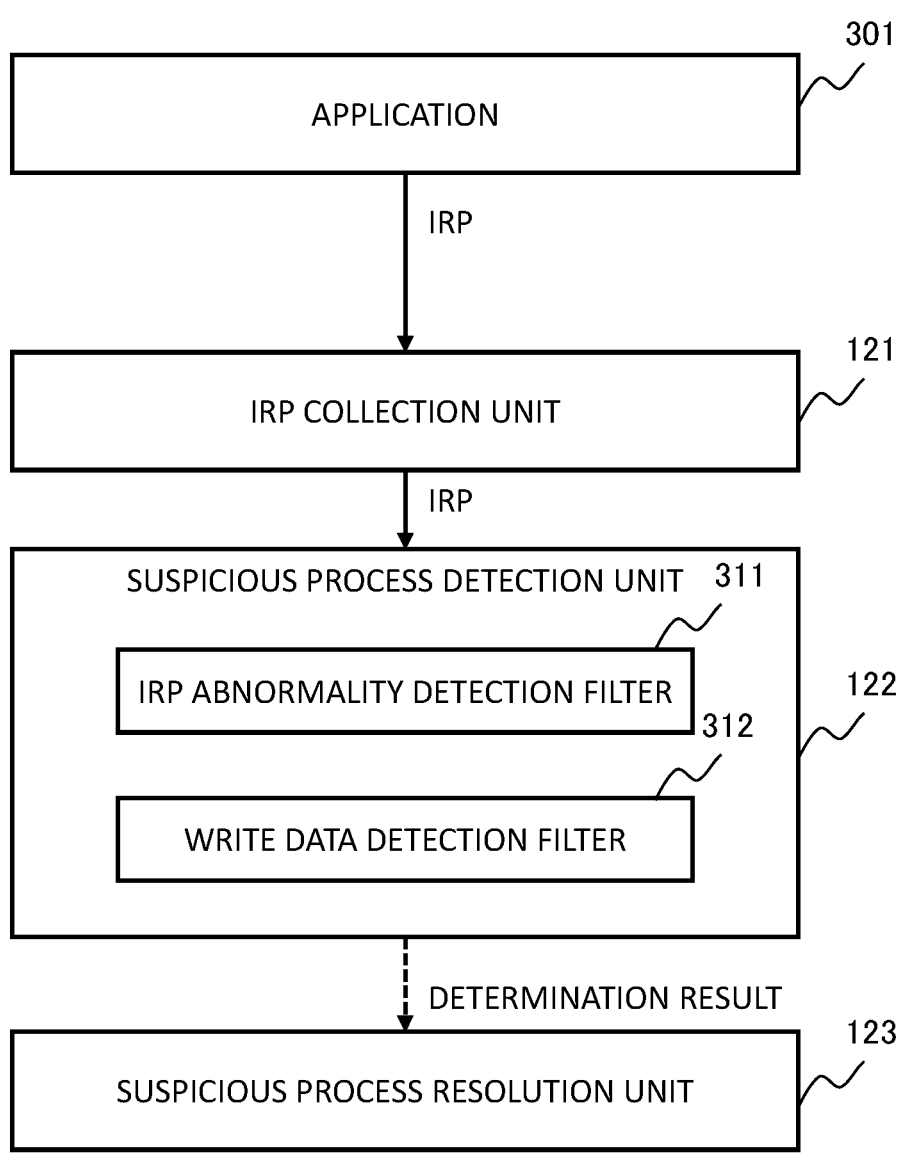
FIG. 2 is a diagram explaining an overview of unauthorized access detection processing.

FIG. 2 is an overview of unauthorized access detection processing performed in the unauthorized access detection system 1. This processing is repeated, for example, when the unauthorized access detection device 10 is activated. Here, a case in which the unauthorized access is ransomware will be described, but the same is true for encryption of files by other types of suspicious processes.

First, an application 301 creates a process for performing file access (writing data into a file or reading data from a file) on the basis of an execution instruction of a suspicious application caused by, for example, false recognition of the user. The created process transmits an I/O request for file access to the I/O manager, and the I/O manager converts the I/O request into the IRP to transmit the converted IRP to a file system device. Thereafter, the content of data contained in the IRP is written into the file.

The IRP collection unit 121 collects the IRPs transmitted from the process. The IRP collection unit 121 transmits the collected IRPs to the suspicious process detection unit 122.

On the basis of the patterns of the extracted IRPs, the IRP abnormality detection filter 311 of the suspicious process detection unit 122 determines whether or not the mode of the file access is abnormal. In addition, the write data detection filter 312 determines whether or not the data related to this file access is abnormal. The encrypted write that the ransomware is to attempt (or performing) is detected by these processing. The determination result by the suspicious process detection unit 122 is transmitted to the suspicious process resolution unit 123.

When receiving the determination result from the suspicious process detection unit 122, the suspicious process resolution unit 123 blocks the IRP and transmits information related to the IRP to the management device 20 on the basis of the received determination result so that the IRP is not transmitted to the file system device. It should be noted that the suspicious process resolution unit 123 may execute only one of these processing. Then, the unauthorized access detection process is terminated.

Next, the details of the unauthorized access detection processing will be described.

FIG. 3 is a flowchart of the unauthorized access detection processing.

First, when each application of the unauthorized access detection device 10 is activated (S401), the IRP collection unit 121 monitors each application and attempts to acquire the IRP transmitted from the process of each application for a predetermined collection period (three seconds in the present embodiment) (S402).

It should be noted that the shorter the collection period the better the system is able to perform ransomware detection in real time. However, if the collection period is too short, the difference in data between the IRP collected when the ransomware or the like performs the encrypted write and the IRP collected under normal conditions other than the encrypted write becomes too small, and there is a possibility that sufficient detection of the ransomware cannot be performed. Therefore, it is preferable to set the collection period long enough to satisfy these conditions.

Next, the IRP abnormality detection filter 311 determines whether or not the trend of the IRPs collected in S402 (that is, the access mode to the file) is abnormal (S403). That is, the IRP abnormality detection filter 311 determines whether or not the trend of the IRPs collected in S402 is abnormal by comparing the trend of the IRP data collected in S402 during the collection period with the trend of the IRP data collected during the collection period under normal conditions.

For example, the IRP abnormality detection filter 311 analyzes the IRP by using abnormality detection using unsupervised learning, which is one of the methods of machine learning. Specifically, the IRP abnormality detection filter 311 creates in advance the AI model 124 that has learned the number of IRPs of each type during the collection period under normal conditions. The IRP abnormality detection filter 311 calculates the divergence between the number of IRPs of each type collected in S402 and the number of IRPs of each type during the collection period under normal conditions by the AI model 124, and determines that the trend of the IRPs collected in S402 is abnormal in the case where the calculated divergence exceeds a predetermined threshold. It should be noted that the analysis method of the trend of the IRPs described here is an example. Other machine learning methods may be used, or a method (for example, pattern matching) other than machine learning may be used.

Here, FIG. 4 is a diagram illustrating an example of the types of IRPs to be analyzed for the trend in the present embodiment. The IRPs include commands for creating, opening, or closing a file, directory access, and flushing a buffer, in addition to writing and reading data. These IRPs are IRPs for which the divergence in the number of executions from normal conditions is observed when the ransomware performs the encrypted write.

Figure 5:
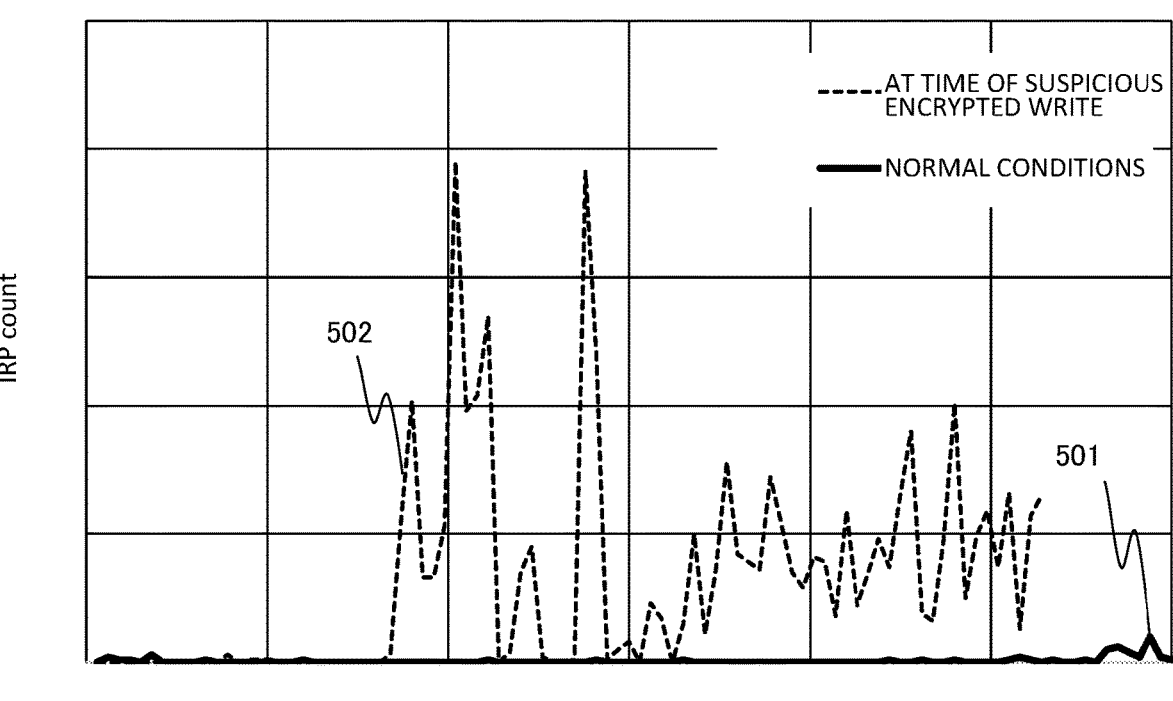
FIG. 5 is a graph of changes in the number of IRPs under normal conditions compared with changes in the number of IRPs under abnormal conditions during a collection period.

In addition, FIG. 5 is a graph of changes in the number of IRPs under normal conditions compared with changes in the number of IRPs under abnormal conditions during the collection period. The horizontal axis shows time, and the vertical axis shows the number of IRPs transmitted for three seconds. As shown in the drawing, the number 502 of IRPs to be compared is much larger than the number 501 of IRPs under normal conditions, and there is a divergence between the two. In such a case, the IRP abnormality detection filter 311 determines that the trend of the IRPs to be compared is abnormal.

Next, as shown in FIG. 3, in the case where the trend of the IRPs collected in S402 is abnormal (S403: Yes), the IRP abnormality detection filter 311 executes the processing of S404, and in the case where the trend of the IRPs collected in S402 is not abnormal (S403: No), the IRP abnormality detection filter 311 executes the processing of S412.

In S404, the IRP abnormality detection filter 311 specifies and acquires the payload of the IRP (IRP_WRITE) for writing data among the IRPs collected in S402. This payload includes the content of data to be written into the file after the IRP_WRITE is transmitted to the file system device.

Then, on the basis of the acquired payload, the IRP abnormality detection filter 311 determines whether or not the data to be written into the file is abnormal data (S405).

In the present embodiment, the IRP abnormality detection filter 311 calculates the degree of randomness on the basis of the entropy of the data to be written into the file, and determines whether or not the calculated degree of randomness is lower than a predetermined prescribed value. The determination method uses a characteristic in which the degree of randomness of data encrypted and written by ransomware increases as compared with the degree of randomness of data written under normal conditions.

It should be noted that the prescribed value may be a constant value regardless of the write destination file, or may be different for each write destination file. For example, since an image file and an encrypted ZIP file are known to have high degrees of randomness even under normal conditions, a high prescribed value may be set for the IRP_WRITE to write data into these files. In addition, this prescribed value may be set on the basis of the results of a pre-trained model that has been created by using machine learning or the like to learn the degree of randomness under normal conditions.

In addition, the degree of randomness may be calculated on the basis of a calculation method other than that based on the entropy. For example, the existence probability of a specific bit pattern in data writing under normal conditions is obtained, and the existence probability may be compared with the bit pattern of the data to be written on the basis of the above payload. In addition, the degree of randomness may be evaluated using a statistical method in which data to be written into a file is unnatural data, in the case where the probability that the same character is included in a character string having a certain length in the data to be written on the basis of the above payload is high.

Further, whether or not the data to be written to the file is abnormal data may be calculated on the basis of other parameters representing the characteristics of the data created by encryption processing than the degree of randomness. For example, in the case where the payload writes data other than a specific pattern, it may be determined that the data to be written into the file is abnormal data.

In the case where the data to be written into the file is abnormal data (S405: No), the IRP abnormality detection filter 311 executes the processing of S406, and in the case where the data to be written into the file is not abnormal data (S405: Yes), the IRP abnormality detection filter 311 executes the processing of S412.

In S406, the IRP abnormality detection filter 311 specifies the trend of the data to be written on the basis of the payload to determine whether or not there is a significant difference from the trend of data (data before writing) in the write destination file based on the payload.

In the present embodiment, the IRP abnormality detection filter 311 determines whether or not the difference between the degree of randomness (first degree of randomness) of the data to be written on the basis of the payload and the degree of randomness (second degree of randomness) of the data (the data of the file before writing) of the write destination file based on the payload is equal to or larger than a predetermined threshold. However, a difference in trend may be determined on the basis of parameters (for example, the pattern of specific data) other than the degree of randomness.

In the case where there is a significant difference between the trend of the data after writing and the trend of the data before writing (S406: Yes), the IRP abnormality detection filter 311 executes the processing of S410, and in the case where there is no significant difference between the trend of the data after writing and the trend of the data before writing (S406: No), the IRP abnormality detection filter 311 executes the processing of S407.

In S407, the IRP abnormality detection filter 311 determines whether or not the start position for writing the data based on the payload is at the beginning of the file. Specifically, the IRP abnormality detection filter 311 acquires offset (the position for writing the data with respect to the beginning of the file) contained in the payload acquired in S404, and determines whether or not the acquired offset is 0.

In the case where the start position for writing the data based on the payload is at the beginning of the file (S407: Yes), the IRP abnormality detection filter 311 executes the processing of S408, and in the case where the start position for writing the data based on the payload is not at the beginning of the file (S407: No), the IRP abnormality detection filter 311 executes the processing of S409.

In S408, the IRP abnormality detection filter 311 refers to the file header table 125 and determines whether or not the array of the data to be written on the basis of the payload includes the array of data of a predetermined file header (file header registered in the file header table 125) (whether or not the data array with a predetermined length from the beginning part of the data to be written matches the file header). (File Header Table)

FIG. 6 is a diagram illustrating an example of the file header table 125. The file header table 125 stores the known types of files (files with high entropy of data to be written under normal conditions) that are generally high in the degree of randomness of data to be written and held from an application via the IRP or the like, and information of data in a file that characterizes the file of the type.

In the present embodiment, this characterizing data is the header of the file, but may be other data. In addition, files with a high degree of randomness of data generally include, for example, image files, video files, or the like, in which standardized data processing (data compression or the like) is performed.

The file header table 125 has each data of an ID 201 of each file type, a type 202 (for example, an extension) of the file, the data array (header value 203) of the header of the file of the type, and the length (header length 204) of the header part. The IRP abnormality detection filter 311 determines whether or not there is a record in which the content of the header value 203 is the same as a binary array with a predetermined length from the beginning of the data to be written on the basis of the payload among the records of the file header table 125.

Then, as shown in FIG. 3, in the case where the beginning part of the data to be written on the basis of the payload includes the data array of a predetermined file header (S408: Yes), the IRP abnormality detection filter 311 executes the processing of S412. On the other hand, in the case where the beginning part of the data to be written on the basis of the payload does not include the data array of a predetermined file header (S408: No), the IRP abnormality detection filter 311 executes the processing of S410. In this case, the writing based on the payload is considered to be unauthorized data writing that rarely occurs under normal conditions such as rewriting the header of a file, or unauthorized data writing with a high degree of randomness (S405) into a file of a type into which data with a low degree of randomness is not written.

In S409, the IRP abnormality detection filter 311 determines whether or not the beginning part of the file into which data is to be written on the basis of the payload includes a predetermined file header (file header registered in the file header table 125). For example, the IRP abnormality detection filter 311 opens a file into which data is to be written on the basis of the payload. The content of the file header can be confirmed as similar to, for example, the processing of S408.

In the case where the beginning part of the file into which data is to be written on the basis of the payload includes a predetermined file header (S409: Yes), the IRP abnormality detection filter 311 executes the processing of S412, and in the case where the beginning part of the file into which data is to be written on the basis of the payload does not include a predetermined file header (S409: No), the IRP abnormality detection filter 311 executes the processing of S410.

In S410, the suspicious process resolution unit 123 determines that the data writing based on the payload is based on ransomware (suspicious encrypted write) and blocks access to the file into which the data is written. For example, the suspicious process resolution unit 123 blocks the IRP (blocks the writing by IRP_WRITE).

In addition, the suspicious process resolution unit 123 transmits information related to the blocked IRP to the management device 20 (S411). This information may include not only the information related to the IRP, but also a basis for the determination as the suspicious encrypted write (information indicating the processing content of S403 to S409) or the determination result thereof. On the basis of the received information, the management device 20 displays a warning screen 701 described later.

It should be noted that the suspicious process resolution unit 123 may transmit the above information on the basis of an e-mail or a predetermined chat tool. In addition, the suspicious process resolution unit 123 may transmit the above information to an external application via a predetermined API provided in the unauthorized access detection device 10. In addition, only one of the processing of S410 and S411 need be performed.

In S412, the unauthorized access detection device 10 repeats the processing after S401.

(Warning Screen)

FIG. 7 is a diagram illustrating an example of the warning screen 701. The warning screen 701 may be displayed by the management device 20 or may be displayed by the unauthorized access detection device 10.

The warning screen 701 has an analysis result display table display part 702. The analysis result display table display part 702 displays each of a detection time 711 of the encrypted write, a name 712 of the process that transmitted the IRP detected as the suspicious encrypted write, a file path 713 into which data is to be written by the IRP detected as the suspicious encrypted write, an entropy value 714 of the write data included in the payload of the IRP detected as the suspicious encrypted write, an entropy value 715 of the data in the file into which the data is to be written by the IRP detected as the suspicious encrypted write, and a result 716 of the determination processing related to the header.

The result 716 of the determination processing displays a Boolean value indicating whether or not the beginning of the write data included in the payload of the IRP detected as the suspicious encrypted write or the beginning of the write destination file matches any value of the header values 203 of the file header table 125 (S408 and S409).

It should be noted that the analysis result display table display part 702 may display only a part of the above display content or may display content other than the above display content.

As described above, the unauthorized access detection device 10 of the present embodiment determines whether or not the access mode to the file is abnormal on the basis of the pattern of the acquired IRP, specifies the data (data written by IRP_WRITE) to be written into the file on the basis of the acquired IRP in the case where it is determined that the access mode to the file is abnormal, determines whether or not the data is abnormal data by specifying the trend of the specified data, and executes predetermined processing related to the access to the file in the case where it is determined that the specified data is abnormal data.

As described above, the unauthorized access detection device 10 determines the encrypted write on the basis of the pattern of the IRP and the data to be written into the file specified by the IRP. That is, the abnormal data write can be determined on the basis of only the IRP directly related to the file access. Accordingly, it is possible to quickly detect an unauthorized file modification with less data. For example, it is possible to detect encryption or writing of random numbers unintended by the user that is performed by ransomware in real time.

In addition, in the case where it is determined that the data written by IRP_WRITE is abnormal data, the unauthorized access detection device 10 of the present embodiment blocks access to the file into which the data is to be written.

Accordingly, it is possible to prevent an unauthorized file modification by ransomware or the like.

In addition, in the case where it is determined that the data written by IRP_WRITE is abnormal data, the unauthorized access detection device 10 of the present embodiment transmits to the management device 20 the information indicating that the access mode to the file is abnormal or that the write data is abnormal data.

Accordingly, the administrator or the like can obtain information characteristic of an unauthorized file modification by ransomware or the like.

In addition, in the case where it is determined that the data written by IRP_WRITE is abnormal data, the unauthorized access detection device 10 of the present embodiment transmits to the management device 20 the information of the basis for the determination that the access mode to the file is abnormal or the information of the basis for the determination that the write data is abnormal data.

Accordingly, the administrator or the like can infer the cause of an unauthorized file modification by ransomware or the like.

In addition, the unauthorized access detection device 10 of the present embodiment determines whether or not the access mode to the file is abnormal on the basis of the pattern of the IRP and the AI model 124 that has learned the characteristics of the input/output request data for accessing the file.

Accordingly, the abnormal access mode to the file can be detected with a high degree of accuracy.

In addition, the unauthorized access detection device 10 of the present embodiment calculates the degree of randomness of the data written by IRP_WRITE, and determines that the write data is abnormal data in the case where the calculated degree of randomness is equal to or larger than a predetermined threshold.

In many cases, the data written by unauthorized access such as ransomware is generally data having irregular content such as encrypted data. Therefore, by determining that the write data is abnormal data in the case where the degree of randomness is equal to or larger than the threshold, the abnormal access mode to the file can be detected with a high degree of accuracy.

In addition, the unauthorized access detection device 10 of the present embodiment determines that the write data is abnormal data in the case where the difference between the first degree of randomness, which is the degree of randomness of the data to be written into the file on the basis of the IRP, and the second degree of randomness of the data in the file before writing on the basis of the IRP is equal to or larger than a predetermined threshold.

Accordingly, it is possible to accurately detect that a normal file with a generally low degree of randomness of data has been written by unauthorized access.

In addition, in the case where the degree of randomness of the data to be written into the file on the basis of the IRP is equal to or larger than the predetermined threshold and the write start position of the data on the file is at the beginning of the file, the unauthorized access detection device 10 of the present embodiment determines that the data to be written is abnormal data in the case where it is determined that the data array at the beginning part of the data does not include the data array of the header in the file header table 125.

In the case where the IRP is not a request to write the header of the existing type of file although the data is written from the beginning of the file, there is a high probability that the data to be written is abnormal data. Therefore, with the above configuration, it is possible to detect an unauthorized file modification typically performed by ransomware.

In addition, in the case where the degree of randomness of the data to be written into the file on the basis of the IRP is equal to or larger than the predetermined threshold, the unauthorized access detection device 10 of the present embodiment determines that the data to be written is abnormal data in the case where it is determined that the data to be written does not include data in a file characterizing a file for holding data with a high degree of randomness.

Although the IRP is a request to write data with a high degree of randomness, in the case where the write data includes data held by a type of file that holds data with a high degree of randomness, there is a high probability that the data writing is normal data writing. Therefore, with the above configuration, it is possible to prevent false detection of an unauthorized file modification performed by ransomware or the like.

In addition, in the case where the degree of randomness of the data to be written into the file on the basis of the IRP is equal to or larger than the predetermined threshold and the write start position on the file as the write destination of the data is at the beginning of the file, the unauthorized access detection device 10 of the present embodiment determines that the data to be written is abnormal data in the case where it is determined that the data to be written does not include the header in a file characterizing the file for holding data with a high degree of randomness in the file header table 125.

The header is data that best characterizes the type of file and the data content thereof. Therefore, in the case where the write start position of the data is at the beginning of the file, it is possible to more reliably prevent false detection of an unauthorized file modification performed by ransomware or the like by using such a header for the determination of abnormal data.

In addition, in the case where the degree of randomness of the data to be written into the file on the basis of the IRP is equal to or larger than the predetermined threshold, the unauthorized access detection device 10 of the present embodiment determines that the data to be written is abnormal data in the case where it is determined that the file does not include data in a file characterizing a file for holding data with a high degree of randomness.

In the case where the file into which the data is to be written includes data in a file characterizing a file for holding data with a high degree of randomness, even if the degree of randomness of the write data is equal to or larger than the predetermined threshold, there is a high probability that the data writing is normal data writing. Therefore, with the above configuration, it is possible to prevent false detection of an unauthorized file modification performed by ransomware or the like.

In addition, in the case where the degree of randomness of the data to be written into the file on the basis of the IRP is equal to or larger than the predetermined threshold and the write start position on the file as the write destination of the data is not at the beginning of the file, the unauthorized access detection device 10 of the present embodiment determines that the data to be written is abnormal data in the case where it is determined that the file does not include the header of a file for holding data with a high degree of randomness in the file header table 125.

The header is data that best characterizes the type of file and the data content thereof. Therefore, in the case where the write start position of the data is not at the beginning of the file, it is possible to more reliably prevent false detection of an unauthorized file modification performed by ransomware or the like by using the header of the write destination file for the determination of abnormal data.

The present invention is not limited to the above embodiment, but can be implemented using optional constitutional elements without deviating from the gist thereof. The above-described embodiment and modified example are only examples, and the present invention is not limited to this content as long as the characteristics of the invention are not impaired. In addition, although various embodiments and modified examples have been described above, the present invention is not limited to this content. Other aspects considered within the scope of the technical idea of the present invention are also included within the scope of the present invention.

For example, some of the hardware provided in each device of the present embodiment may be provided in other devices.

In addition, each program of each device may be provided in other devices, a program may consist of a plurality of programs, or a plurality of programs may be integrated into one program.

In addition, the application may be stored in a device other than the unauthorized access detection device 10.

In addition, the unauthorized access detection device 10 uses the file header table 125 to specify the type of file with a high degree of randomness of the holding data by the header in the present embodiment, but a file with a high degree of randomness of the holding data may be specified by using a characteristic part of the file other than the header.

What is claimed is:

1. An information processing device, comprising:
a processor; and
a memory storing a program causing the processor to:
(A) acquire first input/output request data for accessing a write destination file;

(B) specify data to be written into the write destination file on a basis of the first acquired input/output request data;

(C) determine that the specified data is abnormal data, if all of conditions about the specified data are satisfied, wherein the conditions about the specified data are conditions for determining abnormal data; and (D) execute predetermined processing related to access to the write destination file, if it is determined that the specified data is abnormal data, wherein (C) further includes to:

calculate a first degree of randomness of the specified data;

determine that a first condition of the conditions about the specified data is satisfied, if the first calculated degree of randomness is equal to or larger than a first predetermined threshold; and determine that a second condition of the conditions about the specified data is satisfied, if:

(1) a beginning part of the specified data is not matched to a known file header(s), in case that a write start position on the write destination file for the specified data is a beginning of the write destination file; or (2) a beginning part of the write destination file is not matched to the known file header(s), in case that a write start position on the write destination file for the specified data is not a beginning of the write destination file.

2. The information processing device according to claim 1, wherein the predetermined processing is to block access to the write destination file into which the specified data is to be written.

3. The information processing device according to claim 1, wherein, before processing (B), the program causes the processor to:

determine whether or not an access mode is abnormal, on a basis of one or more patterns of input/output request data and a pre-trained model, and wherein the pre-trained model is trained by characteristics of the input/output request data.

4. The information processing device according to claim 1, wherein (C) includes to:

calculate a second degree of randomness which is a degree of randomness of the data in the write destination file before the specified data is written and determine that a third condition of the conditions about the specified data is satisfied, if difference between the first degree of randomness and the second degree of randomness is lower than a second predetermined threshold.

5. The information processing device according to claim 1, wherein the known file header is a file header of a certain type of file, and the certain type is a file type which is known to have a generally high degree of randomness.

6. The information processing device according to claim 1, wherein a data length of beginning part of the specified data is equal to a length of the known file header.

7. The information processing device according to claim 1, wherein if (1) a beginning part of the specified data is not matched to a known file header(s), in case that a write start position on the write destination file for the specified data is a beginning of the write destination file is satisfied, the second condition is satisfied.

8. The information processing device according to claim 1, wherein if (2) a beginning part of the write destination file is not matched to the known file header(s), in case that a write start position on the write destination file for the specified data is not a beginning of the write destination file is satisfied, the second condition is satisfied.

9. A non-transitory computer readable storage medium storing a program executed by an information processing device, the program comprising:

(A) instructions for acquiring first input/output request data for accessing a write destination file;

(B) instructions for specifying data to be written into the write destination file write destination file , on a basis of the first acquired input/output request data;

(C) instructions for determining that the specified data is abnormal data, if all of conditions about the specified data are satisfied, wherein the conditions about the specified data are conditions for determining abnormal data; and (D) instructions for executing predetermined processing related to access to the write destination file, if it is determined that the specified data is abnormal data, wherein the instructions of (C) includes:

instructions for calculating a first degree of randomness of the specified data;

instructions for determining that a first condition of the conditions about the specified data is satisfied, if the first calculated degree of randomness is equal to or larger than a first predetermined threshold; and instructions for determining that a second condition of the conditions of the specified data is satisfied, if:

(1) a beginning part of the specified data is not matched to a known file header(s), in case that a write start position on the write destination file for the specified data is a beginning of the write destination file; or (2) a beginning part of the write destination file is not matched to the known file header(s), in case that a write start position on the write destination file for the specified data is not a beginning of the write destination file.

10. The non-transitory computer readable storage medium according to claim 9, wherein the predetermined processing is to block access to the write destination file into which the specified data is to be written.

11. The non-transitory computer readable storage medium according to claim 9, wherein, the program comprising:

instructions for determining whether or not an access mode is abnormal, on a basis of one or more patterns of input/output request data and a pre-trained model, and wherein the pre-trained model is trained by characteristics of the input/output request data.

12. The non-transitory computer readable storage medium according to claim 9, wherein the (C) includes:

instructions for calculating a second degree of randomness which is a degree of randomness of the data in the write destination file before the specified data is written; and instructions for determining that a third condition of the conditions about the specified data is satisfied, if difference between the first degree of randomness and the second degree of randomness is lower than a second predetermined threshold.

13. The non-transitory computer readable storage medium according to claim 9,
wherein the known file header is a file header of a certain type of file, and the certain type is a file type which is known to have a generally high degree of randomness.

14. The non-transitory computer readable storage medium according to claim 9,
wherein a data length of beginning part of the specified data is equal to a length of the known file header.

15. The non-transitory computer readable storage medium according to claim 9,
wherein said instructions for determining that the second condition includes instructions for processing (1) a beginning part of the specified data is not matched to a known file header(s), in case that a write start position on the write destination file for the specified data is a beginning of the write destination file.

16. The non-transitory computer readable storage medium according to claim 9,
wherein said instructions for determining that the second condition includes instructions for processing (2) a beginning part of the write destination file is not matched to the known file header(s), in case that a write start position on the write destination file for the specified data is not a beginning of the write destination file.

17. The non-transitory computer readable storage medium according to claim 16,
wherein said instructions for determining the second condition includes instructions for processing (1) a beginning part of the specified data is not matched to a known file header(s), in case that a write start position on the file for the specified data is a beginning of the file.

18. A system comprising:
at least one processor; and
at least one memory storing a program executed by the at least one processor,
wherein the program comprising:
(A) instructions for acquiring first input/output request data for accessing a write destination file;
(B) instructions for specifying data to be written into the write destination file, on a basis of the first acquired input/output request data;
(C) instructions for determining that the specified data is abnormal data, if all of conditions about the specified data are satisfied, wherein the conditions about the specified data are conditions for determining abnormal data; and
(D) instructions for executing predetermined processing related to access to the write destination file, if it is determined that the specified data is abnormal data,
wherein the instructions of (C) includes:
instructions for calculating a first degree of randomness of the specified data;
instructions for determining that a first condition of the conditions about the specified data is satisfied, if the first calculated degree of randomness is equal to or larger than a first predetermined threshold; and
instructions for determining that a second condition of the conditions of the specified data is satisfied, if:

(1) a beginning part of the specified data is not matched to a known file header(s), in case that a write start position on the write destination file for the specified data is a beginning of the write destination file; or (2) a beginning part of the write destination file is not matched to the known file header(s), in case that a write start position on the write destination file for the specified data is not a beginning of the write destination file.

19. The system according to claim 18,
wherein the predetermined processing is to block access to the write destination file into which the specified data is to be written.

20. The system according to claim 18,
wherein, the program comprising:
instructions for determining whether or not an access mode is abnormal, on a basis of one or more patterns of input/output request data and a pre-trained model, and
wherein the pre-trained model is trained by characteristics of the input/output request data.

21. The system according to claim 18,
wherein the (C) includes:
instructions for calculating a second degree of randomness which is a degree of randomness of the data in the write destination file before the specified data is written; and
instructions for determining that a third condition of the conditions about the specified data is satisfied, if difference between the first degree of randomness and the second degree of randomness is lower than a second predetermined threshold.

22. The system according to claim 18,
wherein the known file header is a file header of a certain type of file, and the certain type is a file type which is known to have a generally high degree of randomness.

23. The system according to claim 18,
wherein a data length of beginning part of the specified data is equal to a length of the known file header.

24. The system according to claim 18,
wherein said instructions for determining that the second condition includes instructions for processing (1) a beginning part of the specified data is not matched to a known file header(s), in case that a write start position on the write destination file for the specified data is a beginning of the write destination file.

25. The system according to claim 18,
wherein said instructions for determining that the second condition includes instructions for processing (2) a beginning part of the write destination file is not matched to the known file header(s), in case that a write start position on the write destination file for the specified data is not a beginning of the write destination file.

26. The system according to claim 25,
wherein said instructions for determining that the second condition includes instructions for processing (1) a beginning part of the specified data is not matched to a known file header(s), in case that a write start position on the write destination file for the specified data is a beginning of the write destination file.

* * * * *